Figure 1:
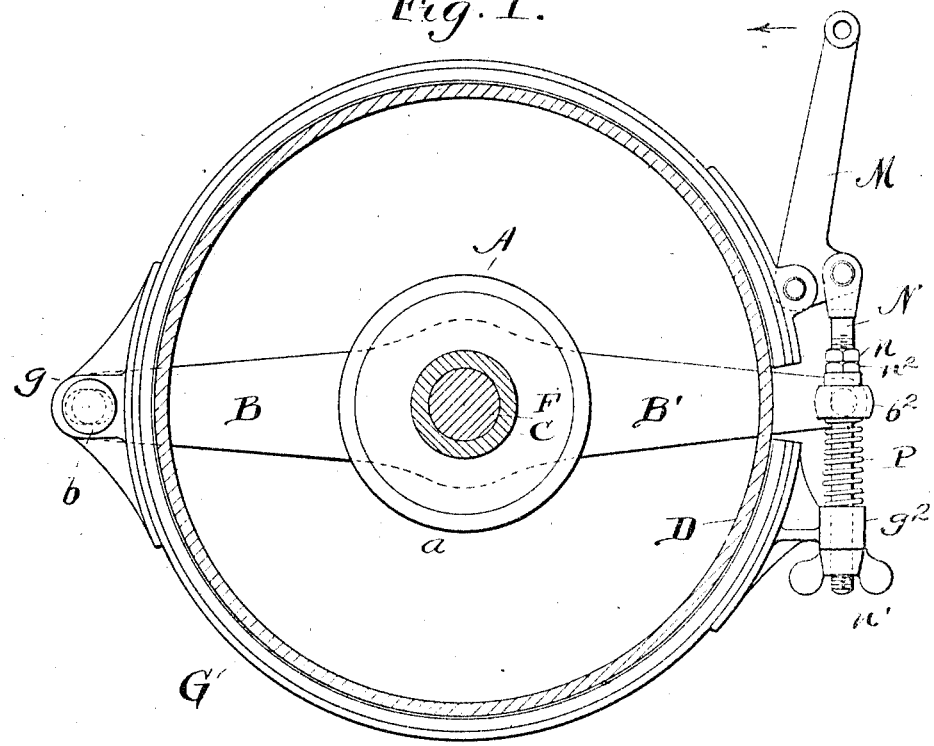

R. H. WHITE.
AUTOMOBILE WHEEL BRAKE.
APPLICATION FILED DEC. 8, 1911.

1,078,976.  Patented Nov. 18, 1913.

UNITED STATES PATENT OFFICE.

ROLLIN H. WHITE, OF CLEVELAND, OHIO, ASSIGNOR TO THE WHITE COMPANY, OF CLEVELAND, OHIO, A CORPORATION OF OHIO.

AUTOMOBILE WHEEL-BRAKE.

1,078,936.   Specification of Letters Patent.   Patented Nov. 18, 1913.

Original application filed October 9, 1908, Serial No. 456,856. Divided and this application filed December 8, 1911. Serial No. 664,565.

*To all whom it may concern:*

Be it known that I, ROLLIN H. WHITE, a citizen of the United States, residing at Cleveland, in the county of Cuyahoga and State of Ohio, have invented a certain new and useful Improvement in Automobile Wheel-Brakes, of which the following is a full, clear, and exact description.

This invention relates to what is known as the outside brake for the driving wheels of an automobile; and consists in the means, substantially as shown in the drawing, and hereinafter described and claimed, for supporting and so operating a split brake band that it may be caused to grip or release a cylindrical brake drum within it.

Figure 2:
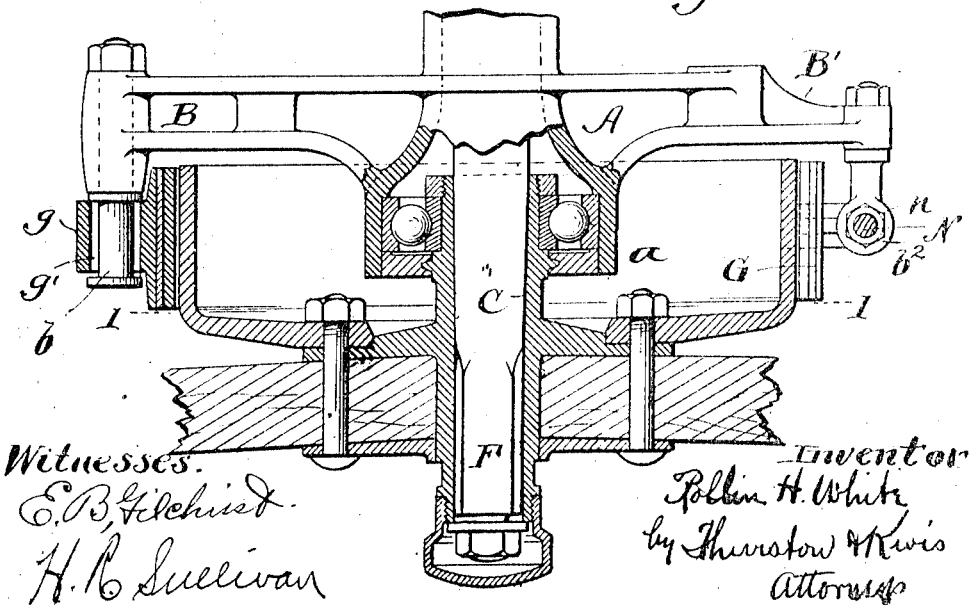

In the drawing, Figure 1 is a sectional end view of the invention in the plane indicated by line 1—1 on Fig. 2; and Fig. 2 is a central horizontal section of the invention.

Referring to the parts by letters, A represents a non-rotative part which is provided with two arms B, B′, which extend horizontally in opposite directions. The part A is intended to be secured to or to be formed on the outer end of what is sometimes known as the dead axle; that is to say, the laterally extended tubular members of the casing which incloses the differential mechanism of the automobile. This non-rotative part A has a cylindrical portion $a$, upon which the hub C of the driving wheel is rotatably mounted by means of suitable anti-friction bearings substantially as shown. A cylindrical brake drum D is rigidly fixed to the wheel hub. The wheel hub may have such connection with the live axle F that it may be rotated thereby.

G represents the outer brake band which is in the form of a split ring. About midway between its ends it is provided with a boss $g$ in which is a horizontal slot $g'$. A flange bearing stud $b$ fixed to the arm B passes through this slot, thereby serving as a support for the middle part of the brake band. At the opposite side of this ring are located means by which the ends thereof may be drawn together so as to cause the brake band to grip the flange D which it surrounds, or release the same, as may be required. These means consist of an operating bell crank lever M which is pivoted to the upper part of the brake band near the end thereof. A link N is pivoted to a short arm of this lever and passes loosely down through a loop $b^2$ which is fixed to the arm B′. This link below this loop passes through a boss $g^2$ formed on the lower part of the brake band near its end. A nut $n'$ is screwed onto the lower end of this link, whereby the operative length of the link may be varied. A nut $n$, together with a lock nut $n^2$ is screwed onto this link above the loop $b^2$, and furnishes a shoulder adapted to engage with this loop, and thereby limit the downward movement of the upper part of the brake band. A coil spring P surrounds the link and is compressed between the loop $b^2$ and the boss $g^2$.

When it is desired to contract the brake band and cause it to grip the brake drum, the operating lever is moved in the direction indicated by the arrow, which will cause the ends of the brake band to be drawn together and produce the desired result. When the lever is swung in the opposite direction, however, the spring P will move the lower part of the brake band downward and therefore away from the brake drum until the shoulder furnished by the nut $n$ strikes the loop $b^2$. The movement of the lever P will also cause the upper part of the brake band to be lifted away from the brake drum. The middle part of the brake drum may be moved horizontally to whatever extent is necessary to free the inner surface of the brake band from contact with the brake drum when the split ends of the band are expanded by the means above specified.

Having described my invention, I claim:

1. The combination of a rotatable wheel having a cylindrical brake drum, of a split brake band which embraces said brake drum, means supporting said brake band at a point about equi-distant from its ends, a fixed loop adjacent to the ends of said brake band, an operating lever pivoted to the brake band near the end thereof which is above said loop, a link which is pivoted to said lever and extends downward therefrom through said loop and is connected with the brake band near the end thereof which is below said loop, a spring acting on said lower end of the brake band to move it down, and a shoulder on the link above said loop to limit said downward movement.

2. The combination of a non-rotating member, having oppositely extended horizontal arms and a cylindrical portion, a wheel which is rotatably mounted on said cylindrical portion and has a cylindrical brake drum, a split brake band which embraces said drum and is connected near its middle with one of said arms by means which permit a substantially horizontal sliding movement of said brake band, a loop carried by the other fixed horizontal arm adjacent to the split in said band, an operating lever pivoted to the upper part of said brake band near its end, a link which is pivotally connected with said lever and extends loosely down through said loop and is connected with the lower part of the brake band near its end, a spring embracing said link and compressed between the loop and the lower end of the brake band, and a shoulder on said link above said loop.

3. The combination of a non-rotating member, a rotatable wheel hub carrying a cylindrical brake drum, a stud secured to said non-rotatable member, a split brake band embracing said brake drum and having about midway between its ends an outwardly projecting boss in which is a horizontal slot through which said stud passes, a bell crank lever pivoted to the upper part of said brake band near the end thereof, a loop fixed to said non-rotatable member, a link pivoted to said bell crank lever and extending downward therefrom through said loop and through a boss on the lower part of the brake band near the end thereof, an adjustable nut upon said link above said loop, a compressed coil spring between said loop and boss, and a nut screwed onto the lower end of said link engaging with said boss.

4. A brake mechanism comprising a shaft, a brake drum thereon, a pair of brake arms each of which has a fixed pivotal connection at one end and is provided with a brake shoe adapted to engage said drum, an actuating lever pivotally connected with one of said arms, a link pivotally connected at one end with said lever and its other end having an adjustable pivotal connection with the other of said arms, a fixed abutment, a spring inclosing said link and engaging said abutment and adapted to move one of said brake arms away from said drum, and an adjustable stop on said link adapted to engage said abutment and cause the other of said arms to move away from said drum.

5. A brake comprising an element adapted to rotate with the wheel, oppositely disposed brake elements adapted to contact with said rotatory element, said brake elements being held from rotatory movement, an abutment located adjacent to the meeting ends of said brake elements, a lever pivoted to the meeting end portion of one of said brake elements, a link member pivotally connecting said lever and the meeting end portion of the opposite brake element, and resilient means acting against said abutment and said last mentioned brake element, whereby said other brake element is moved into contact with said rotatory element before said resiliently opposed brake element when said lever is moved in the direction to set the brake and said resiliently opposed brake element is the first to move out of contact with said rotatory element on the reverse stroke of said lever.

6. A brake comprising an element having a circumferential face and adapted to rotate with the wheel, oppositely disposed brake elements adapted to contact with the circumferential face of said rotatory element, said brake elements being held from rotatory movement, an abutment located adjacent to the meeting ends of said brake elements, a lever pivoted to the meeting end portion of one of said brake elements, a rigid link member pivotally connecting said lever and the meeting end portion of the opposite brake element, said link member slidably engaging said abutment, and a spring acting against said last mentioned brake element and said abutment.

7. A brake comprising a rotatory drum, a brake-band extending around said drum and adapted to contact therewith, said brake-band being held against rotatory movement, but permitted movement toward and away from said drum, an abutment located adjacent to and intermediate the ends of said brake-band, said abutment having an opening therethrough, an operating lever pivotally connected to one end portion of said brake-band, a bolt slidably fitted through the opening in said abutment and pivotally connecting said operating lever and opposite end portion of said brake-band, a spring acting against said last mentioned end portion of the brake-band and the adjacent side of said abutment, and a stop on said bolt adapted to engage the opposite side of said abutment.

8. A brake comprising a rotatory drum, a brake-band extending around said drum adapted to contact therewith, said brake-band being held against rotatory movement, but permitted movement toward and away from said drum, an abutment located adjacent to and intermediate the ends of said brake-band, said abutment having an opening therethrough, an operating lever pivotally connected to one end portion of said brake-band, a bolt slidably fitted through the opening in said abutment and pivotally connected at one end to said operating lever, said bolt being pivotally and adjustably connected to the opposite end of said brake-band, a spring acting against said last mentioned end of the brake-band and the adjacent side of said abutment, and an adjustable stop on said bolt adapted to engage the opposite side of said abutment.

9. A brake comprising a rotatory drum, oppositely disposed brake-elements adapted to contact with said drum, said brake-elements being held against movement in the direction of rotation of said drum, an abutment located adjacent to the ends of said brake elements, an operating lever pivoted to the end portion of one of said brake-elements, a link member pivotally connecting said operating lever with the end portion of the opposite brake-element, a stop on said link member adapted to contact with said abutment to limit the movement of said link member in the direction of said last mentioned brake element, and resilient means acting against said abutment and said last mentioned brake-element.

In testimony whereof, I hereunto affix my signature in the presence of two witnesses.

ROLLIN H. WHITE.

Witnesses:
  H. R. SULLIVAN,
  E. L. THURSTON.